United States Patent [19]

Muraishi et al.

[11] Patent Number: 5,194,050

[45] Date of Patent: Mar. 16, 1993

[54] POSITIONING DEVICE FOR AN ENDLESS BELT

[75] Inventors: Takaya Muraishi, Yokohama; Mitsuru Satoh, Tokyo, both of Japan

[73] Assignee: Ricoh Company, Ltd., Tokyo, Japan

[21] Appl. No.: 782,126

[22] Filed: Oct. 25, 1991

[30] Foreign Application Priority Data

Oct. 25, 1990 [JP] Japan .................................. 2-287841

[51] Int. Cl.⁵ ............................................ F16H 7/00
[52] U.S. Cl. .................................. 474/101; 474/102
[58] Field of Search ............................ 474/101–107, 474/189; 198/202

[56] References Cited

U.S. PATENT DOCUMENTS

| | | | |
|---|---|---|---|
| 2,592,581 | 4/1952 | Lorig | 474/189 X |
| 2,919,793 | 1/1960 | Lorig | 474/102 X |
| 3,545,599 | 12/1970 | Smith et al. | 474/104 X |
| 3,972,414 | 8/1976 | Conrad | 474/102 X |

Primary Examiner—Thuy M. Bui
Attorney, Agent, or Firm—Oblon, Spivak, McClelland, Maier & Neustadt

[57] ABSTRACT

A positioning device for preventing an endless belt passed over a plurality support rollers from being shifted to either of opposite sides in the axial direction of the rollers. A pair of forcing elements are located at both ends of at least one of the support rollers for forcing back, when the belt is shifted toward either of opposite ends of the support roller to contact the end of the latter, the belt toward the center of the roller in the axial direction of the roller. The forcing elements each are implemented as a plurality of spaced flanges. The maximum diameter of the flanges sequentially increases from the innermost flange to the outermost flange in the axial direction of the roller. The plurality of flanges may be replaced with a single spiral flange.

6 Claims, 6 Drawing Sheets

POSITIONING DEVICE FOR AN ENDLESS BELT

BACKGROUND OF THE INVENTION

The present invention relates to a positioning device for preventing an endless belt passed over a plurality of support rollers from being shift to either of opposite sides in the axial direction of the rollers while in operation.

An endless belt is extentsively used with various kinds of machines and apparatuses including image forming apparatuses such as a copier, facsimile apparatus, and a printer. In an image forming apparatus, the endless belt is implemented as a photoconductive belt for carrying a toner image thereon or a transfer belt for transporting a recording medium to which the toner should be transferred. While an endless belt for the above applications is passed over a plurality of support rollers, it is likely that the belt shifts noticeably in the axial direction of the support rollers or weave while in movement. Should the photoconductive belt or the transfer belt, for example, shifts noticeably or weaves as mentioned above, a toner image would not be transferred to an expected position on a recording medium.

To eliminate the above problem, a device for positioning an endless belt has been proposed in various forms in the past. For example, U.S. Pat. No. 2,592,581 teaches a number of annular flanges which are provided on and over the entire length of a support roller and inclined toward the center with respect to the length of the roller. However, the positioning effect achievable with such a flange configuration is limited for the complicated structure. Moreover, because the peripheral surface of such a support roller is not continuous due to the annular flanges, it is not desirable to wrap a belt which should be flat, e.g., a photoconductive belt or a transfer belt around the support roller.

SUMMARY OF THE INVENTION

It is, therefore, an object of the present invention to provide a positioning device which surely prevents an endless belt from being shifted to one side despite a simple construction thereof.

It is another object o the present invention to provide a generally improved positioning device for an endless belt.

In accordance with the present invention, in a positioning device for preventing an endless belt passed over a plurality of support rollers from being shifted to one side in the axial direction of the support rollers while in operation, a pair of forcing means are located at both ends of at least one of the support rollers for forcing back, when the belt is shifted to either of opposite ends of the support roller to contact the end, the belt toward the center of the roller in the axial direction of the roller.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
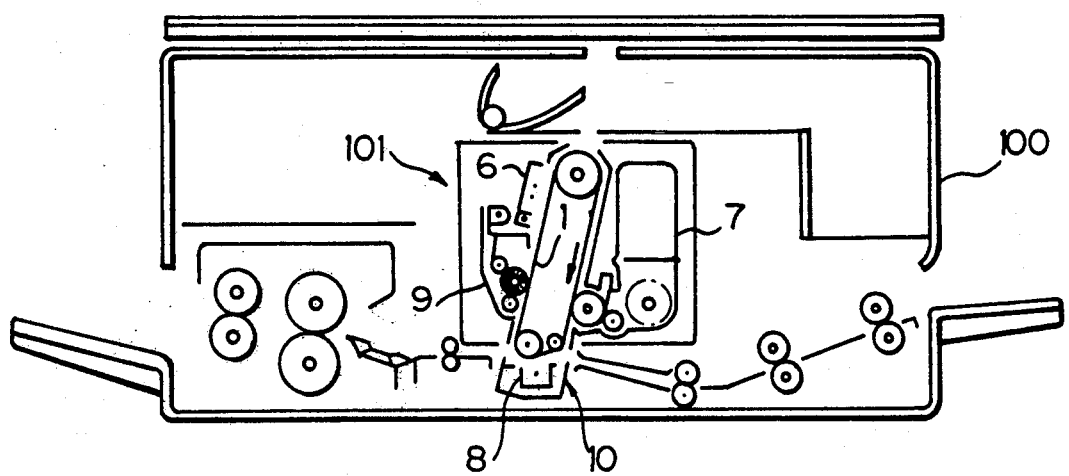
FIG. 1 is a section showing an electronic copier to which a positioning device for an endless belt embodying the present invention is applicable.
Figure 2:
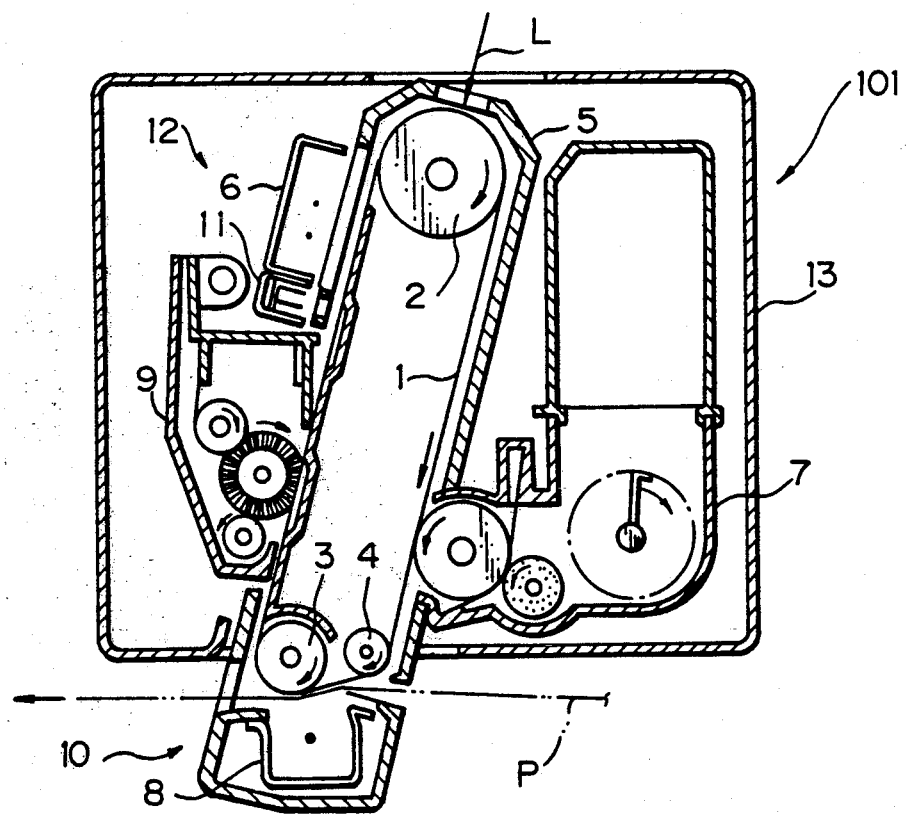
FIG. 2 is a fragmentary enlarged view of the copier.

Referring to FIGS. 1 and 2 of the drawings, an electrophotographic copier to which the present invention is applicable is shown and includes an endless elastic photoconductive belt 1. The belt 1 is passed over a drive roller 2, a driven roller 3, and a tension roller 4. The belt 1 is accommodated in a casing 5 together with a transfer charger 8, constituting a photoconductive element unit 10. This unit 10 is mounted on an image forming system kit 101 and removable in the axial direction of the drive roller 2.

As shown in FIG. 2, various image forming units such as a main charger 6, a developing device 7, a cleaning device 9 and a discharge lamp 11 are arranged around the belt 1 in addition to the transfer charger 8. In the illustrative arrangement, the main charger 6 and discharge lamp 11 are constructed into a single charge and discharge unit 12. The developing unit 7 and cleaning unit 9 are implemented as a developing unit and a cleaning unit, respectively. While the copier is in operation, the main charger 6 uniformly charges the surface of the belt 1 which is driven in a direction indicated by an arrow in FIG. 2. Light representative of a document image is focused onto the belt 1 as indicated by an arrow L with the result that a latent image is electrostatically formed on the charged surface of the belt 1. The developing device 7 develops the latent image to form a toner image. The toner image is transferred to a recording medium in the form of a paper sheet P by the transfer charger 8. After the image transfer, the surface of the belt 1 is cleaned by the cleaning device 9 and then discharged by the discharge lamp 11. The toner removed from the belt 1 is collected in a waste toner bottle by a conveyor screw.

In the copier, the photoconductive element unit 10 and other units are assembled in a frame 13 to constitute the image forming system kit 101. The operator of the copier can move the entire system kit 101 into and out of the copier body 100. Further, the operator can pull the above-described individual units out of the system kit 101 by releasing them from the photoconductive element unit 10.

Figure 3:
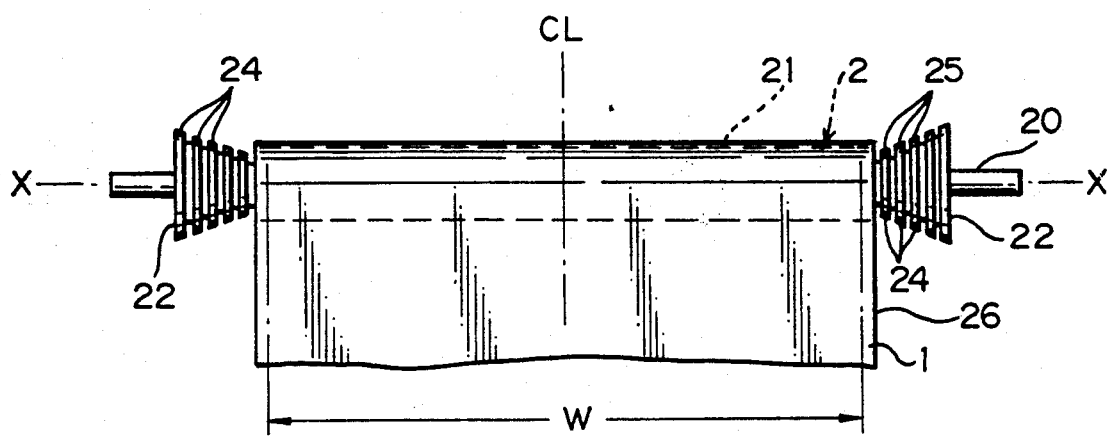
FIG. 3 is a front view of a positioning device embodying the present invention together with a support roller and a belt passed thereover.
Figure 4:
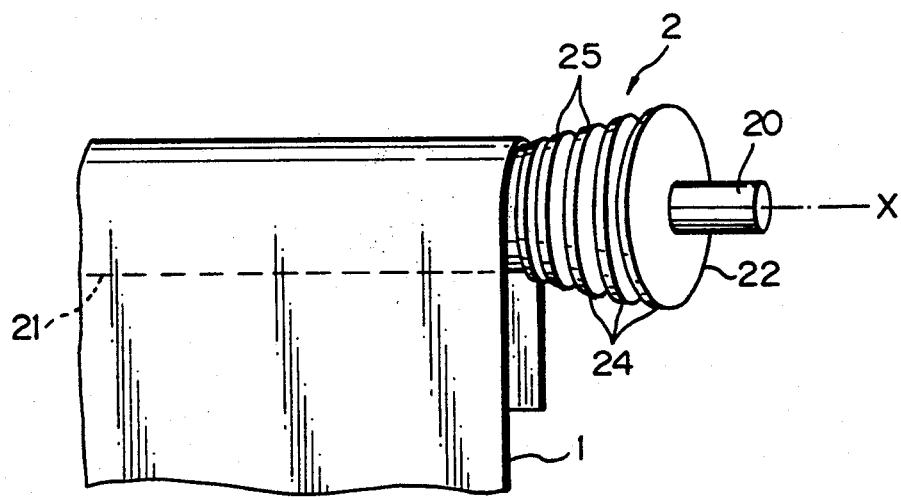
FIG. 4 is a perspective view of the embodiment.
Figure 5:
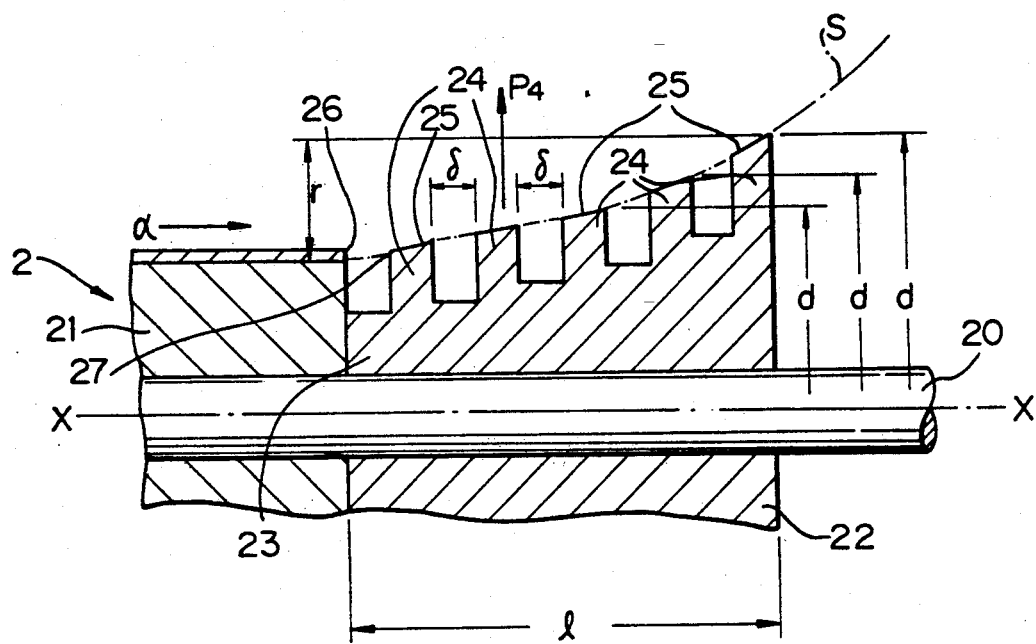
FIG. 5 is a vertical section showing annular flanges constituting the embodiment.

It is likely that the belt 1 passed over the rollers 2, 3 and 4 is noticeably shifted in the axial direction of the rollers 2, 3 and 4. Then, the imagewise light would fail to reach a predetermined position on the belt 1. In light of this, a belt positioning device embodying the present invention is associated with at least one of the rollers 2, 3 and 4, particularly the drive roller 2, as shown in FIGS. 3–5. As shown, the drive roller or support roller 2 has a shaft 20, a roller body 21 mounted on the shaft 20, and ring members 22 affixed to both ends of the shaft 20. The shaft 20 is rotated by a drive motor, not shown. The ring members 22 are located at both sides of the roller body 21 in the axial direction X of the latter. The ring members 22 each has a plurality of annular flanges 24 which extend radially outward from a base portion 23. The rings members 22 may be formed integrally with the roller body 1. The flanges 24 at both sides of the roller body 21 are identical in configuration except that they are symmetrical to each other with respect to the roller body 21.

Nearby ones of the flanges 24 are spaced apart by a distance $\delta$ in the axial direction X of the roller 2. The maximum outside diameter d of the flanges 24 sequentially increases from the innermost flange 24 closest to the center CL of the belt 1 in the widthwise direction, i.e., the center of the roller 2 in the axial direction X to the outermost flange 24. In the illustrative embodiment, as shown in FIG. 5, the outer peripheries 25 of the flanges 24 are so positioned as to extend along a curve (or a line, if desired) S which continuously and smoothly flares from the end of the roller body 21 toward the outside in the axial direction X of the roller 2. In this configuration, the flanges 24 located at the outermost ends of the roller 2 have a greater diameter than the intervening flanges 24. Such outermost flanges 24 are each greater in radius than the roller body 21 by r. This difference r and the length l of the roller 2 in the direction X may be 0.3 millimeter and 10 millimeters, respectively. In the embodiment, the flanges 24 are made of rubber or similar elastic material.

Figure 6:
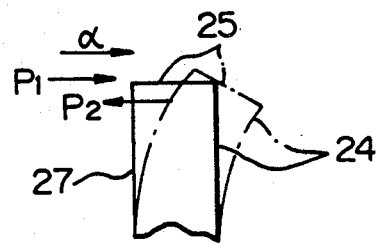
FIG. 6 is a view demonstrating the operation of the annular flanges.

FIGS. 3–5 show the belt 1 in the initial position passed over the roller 2. Assume that while the roller 2 is in rotation, the belt 1 is slightly shifted to the right, as indicated by an arrow $\alpha$ in FIG. 5. Then, the edge 26 of the belt 1 gets on the outer periphery 25 of the innermost or leftmost flange 24 as viewed in FIG. 5 or abuts against the axial end 27 of the leftmost flange 24. As a result, the belt 1 exerts a force on the leftmost flange 24 in a direction $P_1$, FIG. 6, which is the same as the direction $\alpha$. Such a force causes the flange 24 of interest to elastically deform, as indicated by a dash-and-dot line in a somewhat exaggerated form in FIG. 6. Then, the flange 24 elastically springs back to urge the belt 1 toward the center CL, FIG. 3, by a force $P_2$. If the force $P_1$ of the belt 1 is greater than the restoring force $P_2$ of the flange 24, the belt 1 shifts further in the direction $\alpha$ until the edge 26 thereof contacts and deform the second flange 24 as counted from the left in FIG. 5. In this condition, both the first and second flanges 24 exert their restoring forces on the belt 1. The third and successive flanges 24 will act in the same manner as the first and second flanges 24. When the sum of the restoring forces of the flanges 24 comes to balance with the force of the belt 1, the belt 1 stops moving in the direction $\alpha$. In this manner, as the shift of the belt 1 increases, the flanges 24 exert a greater force on the belt 1 in the returning direction, preventing the belt 1 from shifting noticeably to one side.

Figure 7:
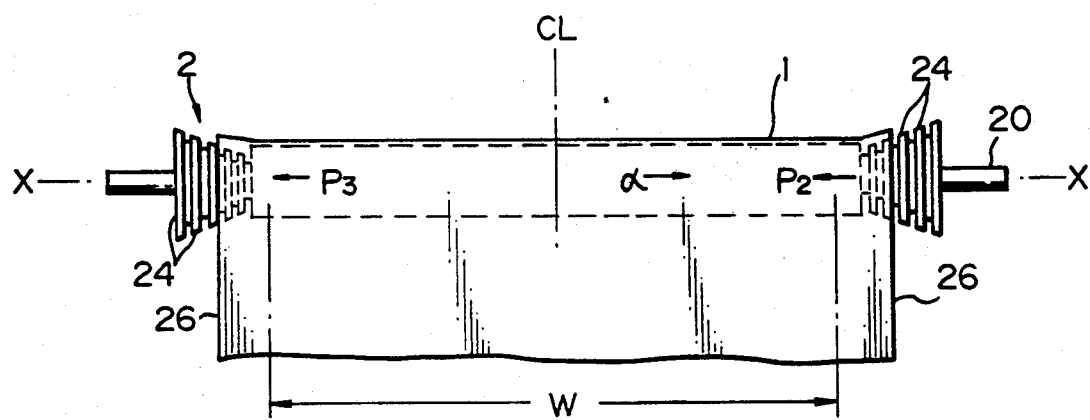
FIG. 7 is a view similar to FIG. 3, showing the support roller and belt in an alternative condition.

In the illustrative embodiment, the belt 1 is passed only over the roller body 21 in the initial condition. Alternatively, as shown in FIG. 7, the belt 1 may extend out from the roller body 21 to cover part of the flanges 24 located at both sides of the roller body 21, i.e., such that the opposite edges 26 thereof wrap around part of the right and left flanges 24. Then, assuming that the belt 1 is shifted in the direction $\alpha$ in FIG. 7 by way of example, the belt 1 is subjected not only to the previously stated restoring forces $P_2$ exerted by the right flanges 24 but also to the restoring forces $P_3$, FIG. 7, exerted by the left flanges 24. This is because the belt 1 shifting in the direction $\alpha$ causes the left flanges 24 to elastically deform or tilt to the right. Both the forces $P_2$ and $P_3$ urge the belt 1 toward the center CL in the widthwise direction of the belt 1, preventing the belt 1 from shifting more positively.

The diameter sequentially increases from the innermost flange 24 to the outermost flange 24 at each end of the roller 2, also serving to prevent the shift of the belt 1. Specifically, the shift of an endless belt to one side is generally ascribable to the difference in circumferential length between the right and left edges of the belt, the parallelism of support roller, the parallelism of the periphery of the rollers, and the difference in tension between the right and left edges of the belt. Regarding a metallic belt or similar belt which does not stretch much when pressurized, a difference in tension between the right and left edges of the belt would cause it to shift to the side where the tension is lower. Assume that the belt 1 is shifted to the right in FIG. 5 to such an extent that the edge 26 thereof gets on the flanges 24 of greater diameters along the curve S. Then, the flanges 24 of interest are elastically deformed to reduce their diameters while exerting the resulting restoring force $P_4$ on the belt 1. As a result, the portion of the belt 1 mounting on the peripheries 25 of such flanges 24 has the tension thereof increased. This results in a difference in tension between the right and left edges of the belt 1 and thereby exerts a force on the belt 1 toward the edge where the tension is lower, i.e., in a direction for causing the belt 1 to come down the flanges 24. Such a force, therefore, further promotes the prevention of the shift of the belt 1.

While the above description has concentrated on the shift of the belt 1 to the right as viewed in FIGS. 3–6, the belt 1 will also be prevented from shifting noticeably when moved to the left.

The flanges 24 at both ends of the roller 2 are located at the outside of the image writing width W, FIGS. 3 and 7, of the belt 1 or the effective width of each unit joining in the image forming procedure. Hence, even when the belt 1 is slightly shifted to the right or to the left to such an extent that the edge thereof gets on the flanges 24, the shift does not effect the image forming procedure at all although the flatness of the belt 1 may be somewhat reduced.

Figure 8:
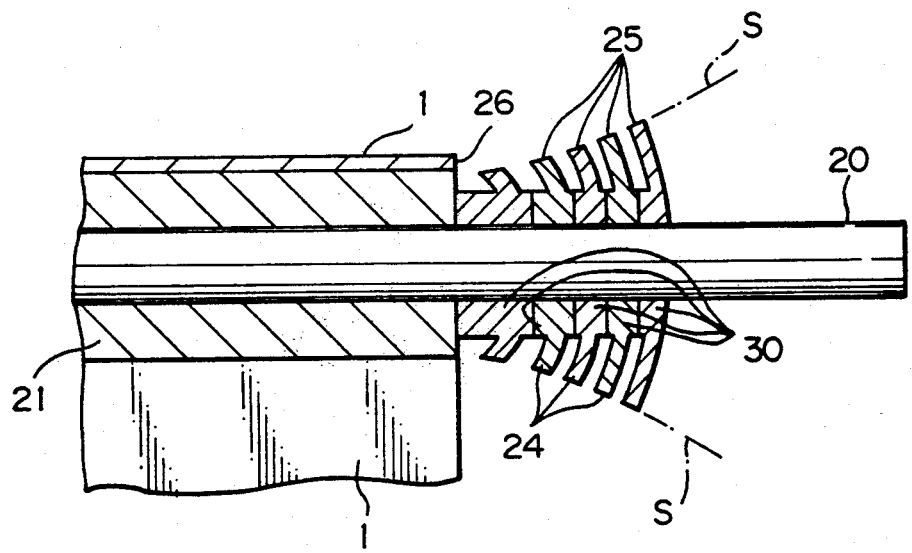
FIG. 8 is a section showing an alternative embodiment of the present invention.

In the illustrative embodiment, the flanges 24 are each perpendicular to the axis X of the roller 2. Alternatively, as shown in FIG. 8, each flange 24 may be inclined toward the center CL, FIG. 3, in the widthwise direction of the belt 1 to further enhance the prevention of the shift of the belt 1. It is to be noted that the configuration of the right flanges 24 shown in FIG. 8 also applies to the left flanges 24, not shown. Specifically, as shown in FIG. 8, the flanges 24 also made of rubber or similar elastic material have a generally bowl-like shape and concave or tilted toward the center CL of the belt 1. To enhance the formability of the flanges 24 at the production stage, the flanges 24 are each molded integrally with a disk 30 which is affixed to the shaft 20. The bowl-like configuration shown in FIG. 8 is similarly applicable to the flanges 24 of the previously described embodiment. Further, the flanges 24 shown in FIG. 8 may be formed integrally with each ring member 22 or with the roller body 21. For the rest of the configuration, the roller 1 of FIG. 8 is identical with that of the previous embodiment. Again, the outer peripheries 25 of the flanges 24 extend along the curve (or line) which changes continuously and smoothly. The curve (or line) S has a gradient which is, for example, about 1/30 in terms of radius.

Figure 9:
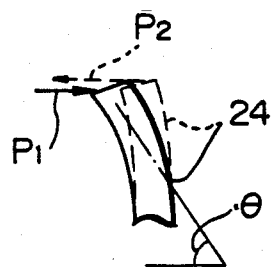
FIG. 9 shows the operation of the embodiment depicted in FIG. 8.

In FIG. 8, assume that the belt 1 has moved slightly to the right causing the edge 26 thereof to contact the flange 24. Then, the flange 24 elastically deforms and exerts the resulting restoring force $P_2$ thereof, FIG. 9, on the belt 1, preventing belt 1 from shifting further to the right. At this instant, the flanges 24 inclined toward the center CL each deforms in such a manner as to rise from a solid line position to a phantom line position, FIG. 9, i.e., toward a flat position. Hence, an intense restoring force $P_2$ is achievable despite that the flange 24 deforms only a little.

In the embodiment of FIG. 8, too, the belt 1 may be configured to cover part of the right and left flanges 24 in the initial condition, as described with reference to FIG. 7. Then, when the belt 1 is moved to one side, the flanges 24 located at the other side will deform to increase their concavity toward the center CL while exerting the resulting recovering force $P_3$ thereof on the belt 1. The sum of the forces $P_2$ and $P_3$ balances with the force $P_1$ of the belt 1 to prevent the shift of the belt 1.

Figure 10:
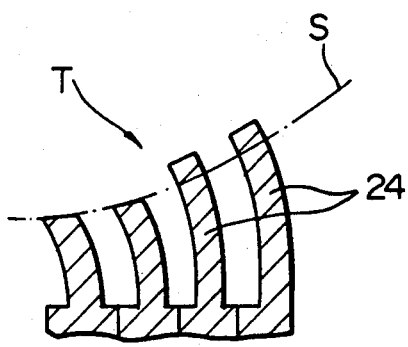
FIG. 10 is a view useful for understanding why the outside diameter of flanges should not be sharply changed.
Figure 11:
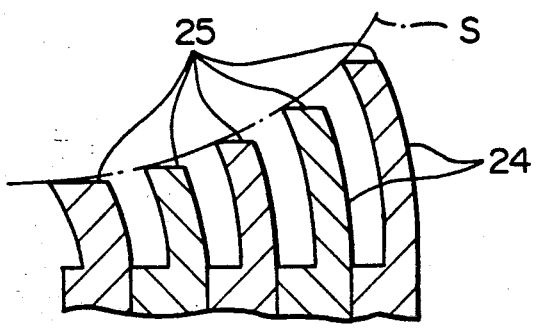
FIG. 11 is section showing another alternative embodiment of the present invention.
Figure 12:
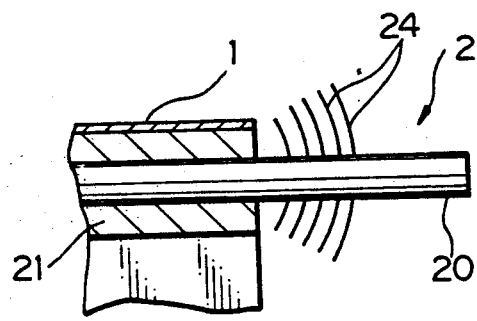
FIG. 12 is a section showing annular flanges constituted by thin sheets of metal.

Preferably, the outside diameters of the flanges 24 sequentially change along a smooth curve (or line), as stated earlier. As shown in FIG. 10, should the diameters of the flanges 24 sharply change at, for example, the position T, part of the belt abutting against the flange 24 located at the position T would be effected by a substantial force to have the photoconductive surface thereof distorted. It should be noted that not the entire outer periphery 25 of each flange 24 has to extend along the curve (or line), as shown in FIG. 11. Each flange 24 should advantageously be made of rubber in order to insure the elastic restoring force $P_2$. Alternatively, as shown in FIG. 12, use may be made of annular flanges 24a made of metal. In FIG. 12, such metallic flanges 24a are affixed to the shaft 20 of the roller 2. In this case, if the flanges 24a are made of hard resin or similar material which does not deform at all or deforms little, it is likely that the flanges 24a deform the belt 1 when the latter is shifted to get thereon.

Figure 13:
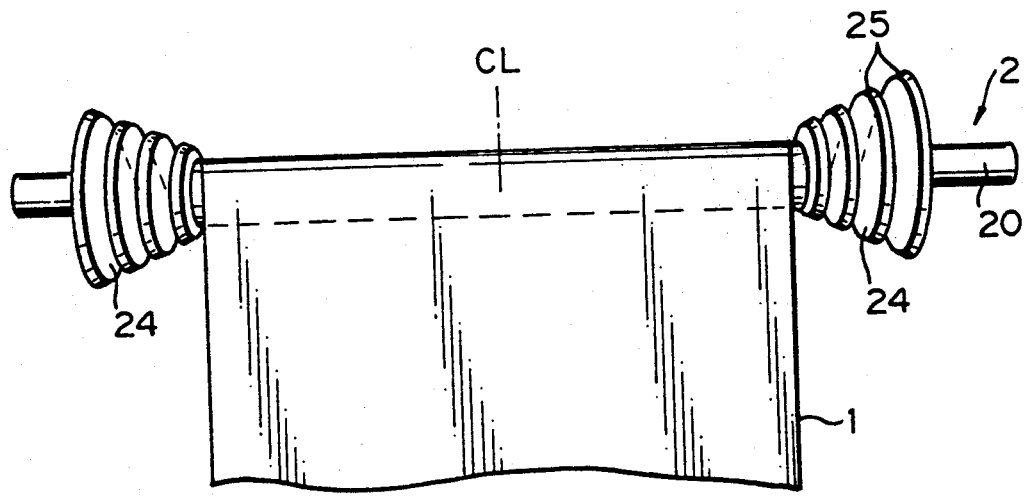
FIG. 13 shows another alternative embodiment of the present invention.

FIG. 13 shows alternative embodiment of the present invention. As shown, the flanges 24 located at each end of the roller 20 are implemented as a continuous spiral whose diameter sequentially increases toward the outside. This kind of configuration is comparable with the previous configurations in respect of advantages. Such a spiral cofiguration is also applicable to any one of the embodiments shown and described.

Of course, any one of the embodiments of the present invention may be implemented as a device for positioning the previously mentioned transfer belt or similar endless belt having relatively low elasticity.

In summary, it will be seen that the prevent invention provides a device which with a simple configuration prevents a belt from being dislocated over a long period of time. While the device is in operation, it allows a minimum of displacement of the belt to occur.

Various modifications will become possible for those skilled in the art after receiving the teachings of the present disclosure without departing from the scope thereof.

What is claimed is:

1. In a positioning device for preventing an endless belt passed over a plurality of support rollers from being shifted to one side in an axial direction of said support rollers while in operation, a pair of forcing means are located at both ends of at least one of said support rollers for forcing back, when said belt is shifted to either of opposite ends of said support roller to contact said end, said belt toward the center of said roller in the axial direction of said roller.

2. A device as claimed in claim 1, wherein each of said forcing means comprises a plurality of annular flanges which are arranged in spaced locations along the axial direction of said support roller.

3. A device as claimed in claim 2, wherein the maximum diameter of said flanges sequentially increases from the flange closest to said center of said support roller toward the flange farthest from said center of said support roller.

4. A device as claimed in claim 2, wherein said flanges are each inclined toward said center of said support roller.

5. A device as claimed in claim 4, wherein said flanges are each concave toward said center of said support roller in a generally bowl-line configuration.

6. A device as claimed in claim 1, wherein each of said forcing means comprises a spiral flange whose outside diameter sequentially increases toward the outside away from said center of said support roller.

* * * * *